US012731044B2

(12) United States Patent
Fidaleo et al.

(10) Patent No.: US 12,731,044 B2
(45) Date of Patent: Sep. 8, 2026

(54) EMOTIONALLY RESPONSIVE ARTIFICIAL INTELLIGENCE INTERACTIVE CHARACTER

(71) Applicant: Disney Enterprises, Inc., Burbank, CA (US)

(72) Inventors: Douglas A. Fidaleo, Canyon Country, CA (US); James R. Kennedy, Glendale, CA (US); Michael Barron, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 804 days.

(21) Appl. No.: 18/119,716

(22) Filed: Mar. 9, 2023

(65) Prior Publication Data

US 2024/0135202 A1 Apr. 25, 2024

Related U.S. Application Data

(60) Provisional application No. 63/380,232, filed on Oct. 19, 2022.

(51) Int. Cl.
*G06N 5/02* (2023.01)
*G06N 5/022* (2023.01)

(52) U.S. Cl.
CPC .................................... *G06N 5/022* (2013.01)

(58) Field of Classification Search
CPC ................................. G06N 5/02; G06N 5/022
See application file for complete search history.

(56) References Cited

U.S. PATENT DOCUMENTS 10,885,380 B2 * 1/2021 Ko .......................... G06F 18/23
11,461,952 B1 10/2022 Bosnak
2019/0224853 A1 7/2019 Gewecke
2019/0325868 A1 * 10/2019 Lecue ..................... G10L 25/63
2021/0075747 A1 * 3/2021 Goslin .................... H04L 51/02
(Continued)

OTHER PUBLICATIONS

Xu, Xinchao, et al. "Long time no see! open-domain conversation with long-term persona memory." arXiv preprint arXiv:2203.05797 (2022). (Year: 2022).*

(Continued)

*Primary Examiner* — Hal Schnee
(74) *Attorney, Agent, or Firm* — Farjami & Farjami LLP

(57) ABSTRACT

A system includes a computing platform having a hardware processor and a memory storing software code, a memory data structure storing memory features for an artificial intelligence interactive character (AIIC), and a trained machine learning (ML) model. The hardware processor executes the software code to receive interaction data describing a communication by a user with the AIIC, predict, using the trained ML model and the interaction data, at least one user memory feature(s) of the communication, and identify, using the memory data structure, one or more of the memory features for the AIIC as corresponding to the user memory feature(s). The software code also determines, using the user memory feature(s) and the corresponding one or more of the memory features for the AIIC, an interactive communication for execution by the AIIC in response to the communication by the user; and outputs the interactive communication to the AIIC.

20 Claims, 8 Drawing Sheets

(56) References Cited

U.S. PATENT DOCUMENTS

| | | | | |
|---|---|---|---|---|
| 2022/0012073 | A1* | 1/2022 | Granot | G06F 9/451 |
| 2022/0051071 | A1* | 2/2022 | Prayaga | G10L 15/22 |
| 2022/0253609 | A1 | 8/2022 | Tiwari | |
| 2022/0253717 | A1* | 8/2022 | Martin | G06N 3/10 |
| 2023/0075137 | A1* | 3/2023 | Abhyankar | G06Q 10/40 |

OTHER PUBLICATIONS

Finch, Sarah E., et al. "An approach to inference-driven dialogue management within a social chatbot." arXiv preprint arXiv:2111.00570 (2021). (Year: 2021).*
Extended European Search Report dated Mar. 12, 2024 for EP Application 23182707.2.
U.S. Appl. No. 18/119,737, filed Mar. 9, 2023.

* cited by examiner

100
System Memory 106
ML Model(s)
128
AIIC Memories Database
120
122
110
Software Code
124
User History Database
126
Hardware Processor
104
Input Unit
130
138
Output Unit
140
102
108
Communication Network 111
115
116a
117
115
117
114
132
Large-Language ML Model
112
116b
114
117
129

Figure 4:
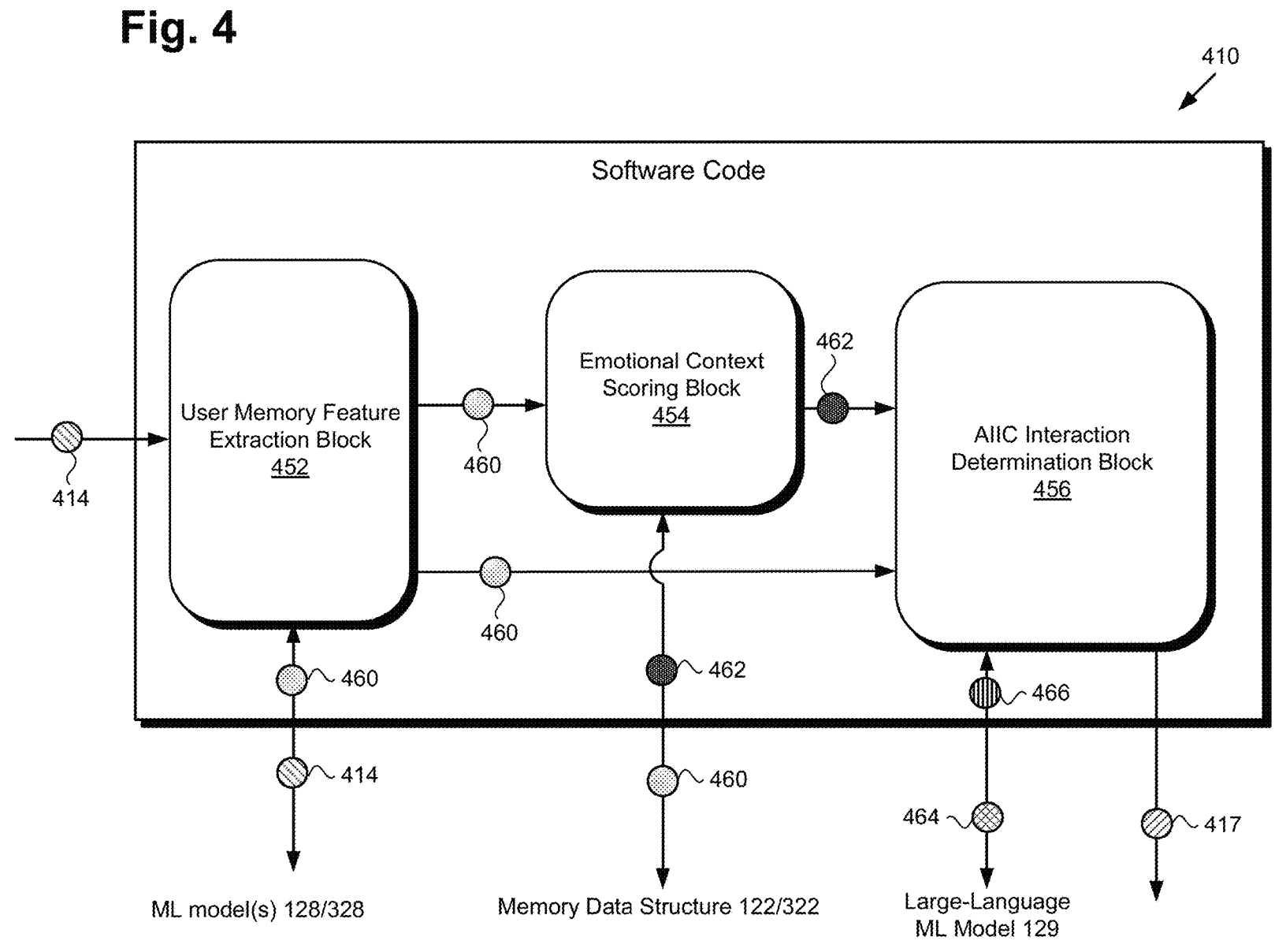

Software Code

User Memory Feature Extraction Block 452

Emotional Context Scoring Block 454

AIIC Interaction Determination Block 456

414

460

460

462

460

414

460

462

466

464

417

ML model(s) 128/328

Memory Data Structure 122/322

Large-Language ML Model 129

EMOTIONALLY RESPONSIVE ARTIFICIAL INTELLIGENCE INTERACTIVE CHARACTER

RELATED APPLICATIONS

The present application claims the benefit of and priority to U.S. Provisional Patent Application Ser. No. 63/380,232 filed on Oct. 19, 2022, and titled "System and Method for Promoting Emotional Bonding with an Artificially Intelligent Character via Shared Memories," which is hereby incorporated fully by reference into the present application.

BACKGROUND

Establishing a deep emotional connection between a human and an artificial intelligence (AI) character is an unsolved problem of significant importance to many fields. Although there is evidence in the psychology literature that sharing memories creates a sense of relationship closeness between individuals, that apparent ability to share memories has not heretofore been extended to AI characters. The emotional closeness engendered by the sharing of memories is often enhanced when these memories are relatable between the individuals, i.e., the individuals have similar experiences or interpretations of those experiences. Such closeness generally improves communication between individuals and tends to make interactions richer and more pleasurable. However, until now, AI agents have had only crude ability to mimic human emotional behavior, which may be off-putting rather than enjoyable. Thus, there exists a need in the art for systems and methods to improve the ability of AI characters to express language and behaviors in a manner similar to individuals having shared memories.

BRIEF DESCRIPTION OF THE DRAWINGS

FIG. 4 shows a diagram of a software code suitable for use by the systems shown in FIGS. 1 and 3, according to one implementation;

DETAILED DESCRIPTION

Figure 1:
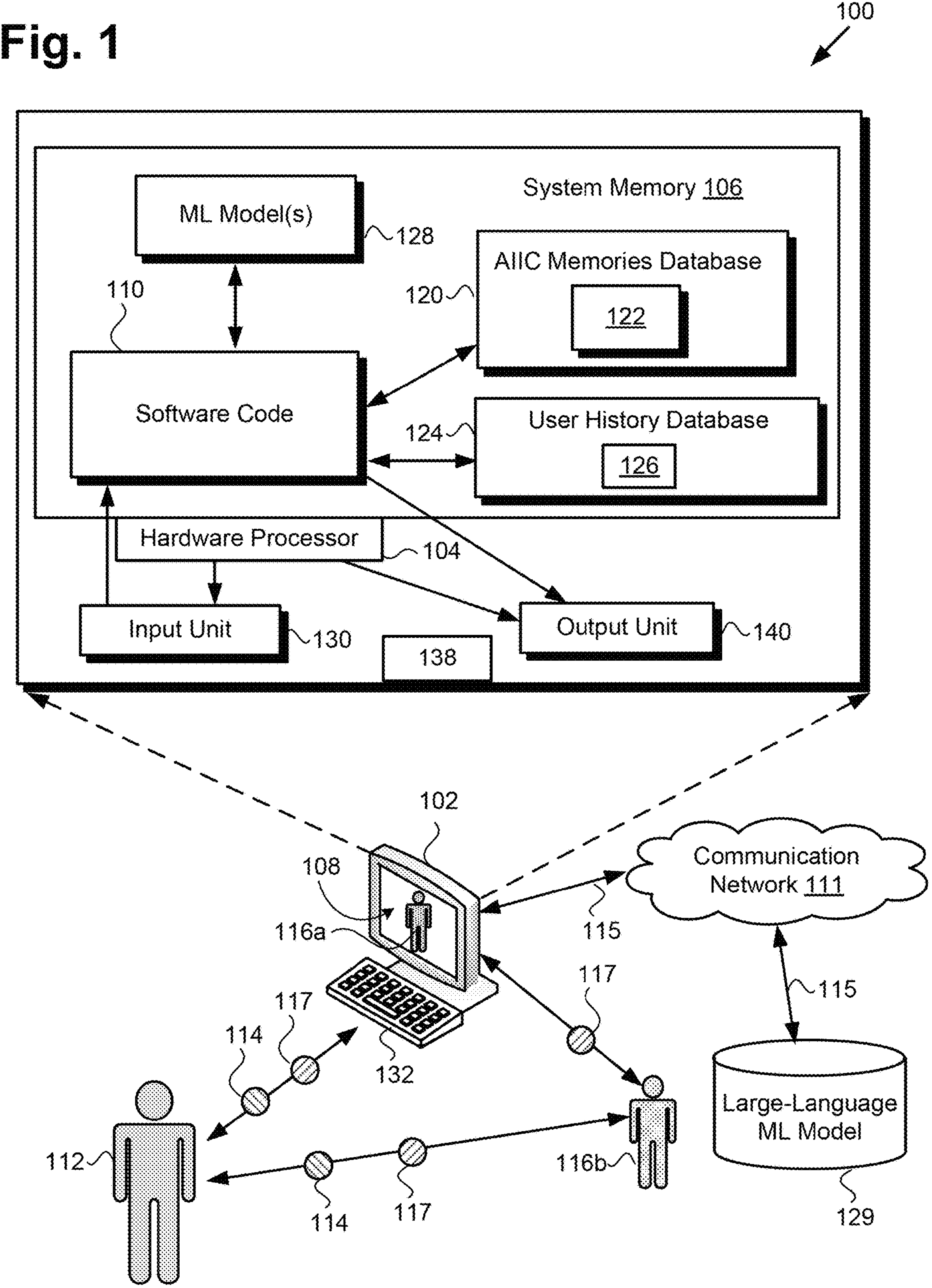
FIG. 1 shows an exemplary system for providing an emotionally responsive artificial intelligence interactive character (AIIC), according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing an emotionally responsive artificial intelligence interactive character (AIIC) that address and overcome the deficiencies in the conventional art. As defined in the present application, Artificial Intelligence (AI) characters refer generally to artificially intelligent agents that exhibit behavior and intelligence that can be perceived by humans as a unique individual with its own personality. AI characters may be implemented as machines or other physical devices, such as robots or toys, or may be virtual entities, such as digital characters presented by animations on a screen or by a chat bot. AI characters may exhibit characteristics of living or historical characters, fictional characters from literature, film and the like, or simply unique individuals that exhibit patterns that are recognizable by humans as a personality. AI characters may exhibit emotions through interactive communications including language (e.g., speech patterns, prosody, word choice, and the like) as well as by movements, pose, and gestures when rendered visually.

It is noted that, as defined in the present application, the term "interactive communication" may refer to language based communications in the form of speech or text, for example, and in some implementations may include non-verbal expressions. Moreover, the term "non-verbal expression" may refer to vocalizations that are not language based, i.e., non-verbal vocalizations, as well as to physical gestures and other movement, facial expressions, and postures. Examples of non-verbal vocalizations may include a sigh, a murmur of agreement or disagreement, or a giggle, to name a few.

It is also noted that, as used in the present application, the terms "automation," "automated," and "automating" refer to systems and processes that do not require the participation of a human administrator. Although in some implementations the interactive communications determined by the systems and methods disclosed herein may be reviewed or even modified by a human editor or system administrator, that human involvement is optional. Thus, the methods described in the present application may be performed under the control of hardware processing components of the disclosed systems.

FIG. 1 shows a diagram of system 100 providing an emotionally responsive AIIC, according to one exemplary implementation. As shown in FIG. 1, system 100 includes computing platform 102 having hardware processor 104, input unit 130 including input device 132, output unit 140 including display 108, transceiver 138, and system memory 106 implemented as a non-transitory storage medium. According to the present exemplary implementation, system memory 106 stores software code 110, AIIC memories database 120 including memory data structure 122 storing memory features for an AIIC, user history database 124, and one or more trained machine learning (ML) models 128

(hereinafter "ML model(s) 128"). In addition, FIG. 1 shows AIICs 116*a* and 116*b* for which interactive communications for providing an emotionally responsive interaction may be determined using software code 110, when executed by hardware processor 104.

As further shown in FIG. 1, system 100 is implemented within a use environment including communication network 111 providing network communication links 115, and large-language ML model 129 communicatively coupled to system 100 via communication network 110 and network communication links 114. Also shown in FIG. 1 are user 112 of system 100 communicating with one or both of AIICs 116*a* and 116*b*, user history 126 of user 112, interaction data 114, and interactive communication 117 determined for one of AIICs 116*a* or 116*h* by software code 110, to engage in an emotionally responsive interaction with user 112.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

It is further noted that system 100 may be implemented as any machine configured to instantiate an AIIC, such as AIIC 116*a* or 116*h*. It is further noted that although FIG. 1 depicts AIIC 116*a* as being instantiated as a digital character rendered on display 108, and depicts AIIC 116*b* as a robot, those representations are provided merely by way of example. In other implementations, one or both of AIICs 116*a* and 116*b* may be instantiated by tabletop machines, such as speakers, displays, or figurines, or by wall mounted speakers or displays, to name a few examples. It is noted that AIIC 116*b* corresponds in general to AIIC 116*a* and may include any of the features attributed to AIIC 116*a*. Moreover, although not shown in FIG. 1, like computing platform 102, AIIC 116*h* may include hardware processor 104, input unit 130, output unit 140, transceiver 138, and system memory 106 storing software code 110, AIIC memories database 120 including memory data structure 122, and user history database 124 including user history 126 of user 112.

Furthermore, although FIG. 1 depicts one user 112 and two AIICs 116*a* and 116*h*, that representation is merely exemplary. In other implementations, one AIIC, two AIICs, or more than two AIICs may engage in an interaction with one another, with one or more human beings corresponding to user 112, or with one or more human beings as well as with one or more other AIICs. That is to say, in various implementations interaction partners may include one or more interactive machines each configured to instantiate an AIIC, one or more digital characters each instantiating an AIIC, one or more human beings, or an interactive machine or machines in combination with a digital character or characters and one or more human beings.

It is also noted that although FIG. 1 depicts single user history 126 corresponding to user 112, user history database 124 will typically store thousands or millions of user histories. Moreover, it is noted that user history 126 may be an interaction history dedicated to cumulative interactions of an AIIC with a user, such as user 112, or to one or more distinct temporal sessions over which an interaction of one or more AIICs and user 112 extends. Furthermore, while in some implementations user history 126 may be comprehensive with respect to interactions by user 112 with AIIC 116*a*, 116*b*, or both AIIC 116*a* and AIIC 116*h*, in other implementations, user history 126 may retain only a predetermined number of the most recent interactions by user 122 with AIIC 116*a*, 116*b*, or both AIIC 116*a* and AIIC 116*b*.

It is emphasized that the data describing previous interactions and retained in user history database 124 is exclusive of personally identifiable information (PII) of users with whom AIICs 116*a* and 116*b* have interacted. Thus, although AIICs 116*a* and 116*b* are typically able to distinguish an anonymous user with whom a previous interaction has occurred from anonymous users having no previous interaction experience with AIIC 116*a* or AIIC 116*b*, user history database 124 does not retain information describing the age, gender, race, ethnicity, or any other PII of any user with whom AIIC 116*a* or AIIC 116*b* converses or otherwise interacts.

Although the present application refers to software code 110, AIIC memories database 120, user history database 124, and ML model(s) 128 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, AIIC memories database 120, user history database 124, and ML model(s) 128 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100.

Thus, although in some implementations, as shown in FIG. 1, system 100 may be implemented as a personal computing device. However, in other implementations computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of private or limited distribution network. Consequently, in some implementations, software code 110, AIIC memories database 120, user history database 124, and ML model(s) 128 may be stored remotely from one another on the distributed memory resources of system 100.

When implemented as a personal computing device, as shown in FIG. 1, computing platform 102 may take the form of a desktop computer, or any other suitable mobile or stationary computing system that implements data processing capabilities sufficient to support connections to communication network 111, provide a user interface, and implement the functionality ascribed to computing platform 102 herein. For example, in other implementations, computing platform 102 may take the form of a laptop computer, tablet computer, or smartphone, for example, providing display 108. Display 108 may take the form of a liquid crystal display (LCD), a light-emitting diode (LED) display, an organic light-emitting diode (OLED) display, a quantum dot (QD) display, or any other suitable display screen that performs a physical transformation of signals to light.

It is also noted that although FIG. 1 shows input unit 130 as including input device 132, output unit 140 as including display 108, and both input unit 130 and output unit 140 as residing on computing platform 102, those representations are merely exemplary as well. In other implementations including an all-audio interface, for example, input unit 130 may be implemented as a microphone, while output unit 140 may take the form of a speaker. Moreover, in implementations in which AIIC 116*b* takes the form of a robot or other type of machine, input unit 130 and/or output unit 140 may be integrated with AIIC 116*b* rather than with computing platform 102. In other words, in some implementations, AIIC 116*b* may include one or both of input unit 130 and output unit 140.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms “central processing unit” (CPU), “graphics processing unit” (GPU), and “tensor processing unit” (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as machine learning modeling.

Input device 132 of system 100 may include any hardware and software enabling user 112 to enter data into system 100. Examples of input device 132 may include a keyboard, trackpad, joystick, touchscreen, or voice command receiver, to name a few. Transceiver 138 of system 100 may be implemented as any suitable wireless communication unit. For example, transceiver 138 may be implemented as a fourth generation (4G) wireless transceiver, or as a 5G wireless transceiver. In addition, or alternatively, transceiver 138 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

Figure 2A:
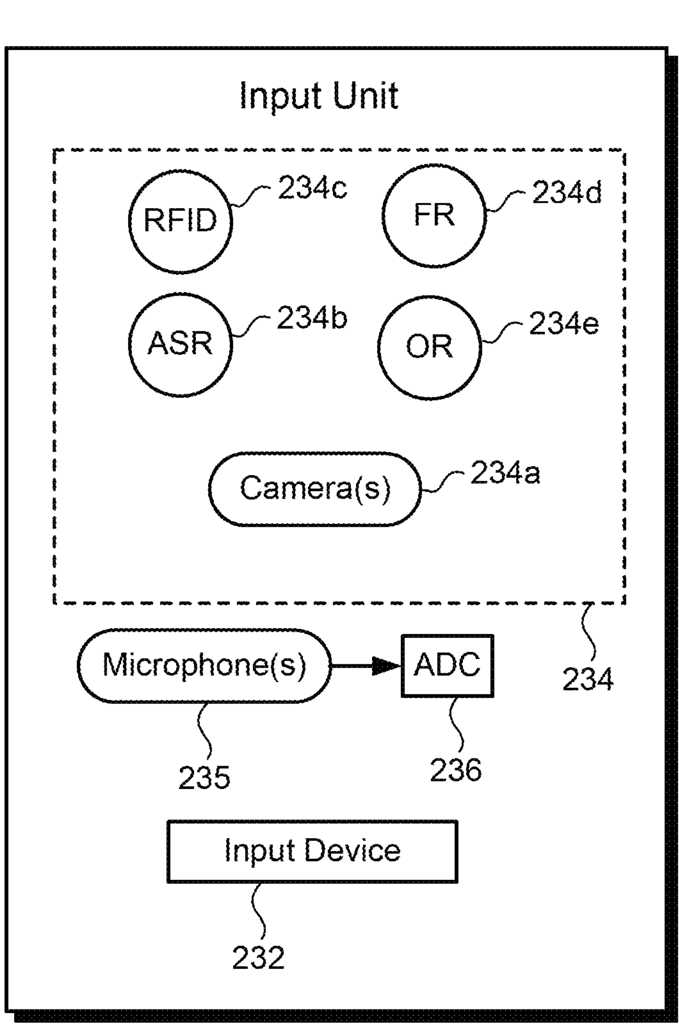
FIG. 2A shows a more detailed diagram of an input unit suitable for use as a component of the system shown in FIG. 1, according to one implementation.

FIG. 2A shows a more detailed diagram of input unit 230 suitable for use as a component of system 100, in FIG. 1, according to one implementation. As shown in FIG. 2A, input unit 230 may include input device 232, multiple sensors 234, one or more microphones 235 (hereinafter “microphone(s) 235”), and analog-to-digital converter (ADC) 236. As further shown in FIG. 2A, sensors 234 of input unit 230 may include one or more cameras 234*a* (hereinafter “camera(s) 234*a*”), automatic speech recognition (ASR) sensor 234*b*, radio-frequency identification (RFID) sensor 234*c*, facial recognition (FR) sensor 234*d*, and object recognition (OR) sensor 234*e*. Input unit 230 and input device 232 correspond respectively in general to input unit 130 and input device 132, in FIG. 1. Thus, input unit 130 and input device 132 may share any of the characteristics attributed to respective input unit 230 and input device 232 by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than camera(s) 234*a*, ASR sensor 234*b*, RFID sensor 234*c*, FR sensor 234*d*, and OR sensor 234*e*. Moreover, in some implementations, sensors 234 may include a sensor or sensors other than one or more of camera(s) 234*a*, ASR sensor 234*b*, RFID sensor 234*c*, FR sensor 234*d*, and OR sensor 234*e*. It is further noted that, when included among sensors 234 of input unit 130/230, camera(s) 234*a* may include various types of cameras, such as red-green-blue (RGB) still image and video cameras, RGB-D cameras including a depth sensor, and infrared (IR) cameras, for example.

Figure 2B:
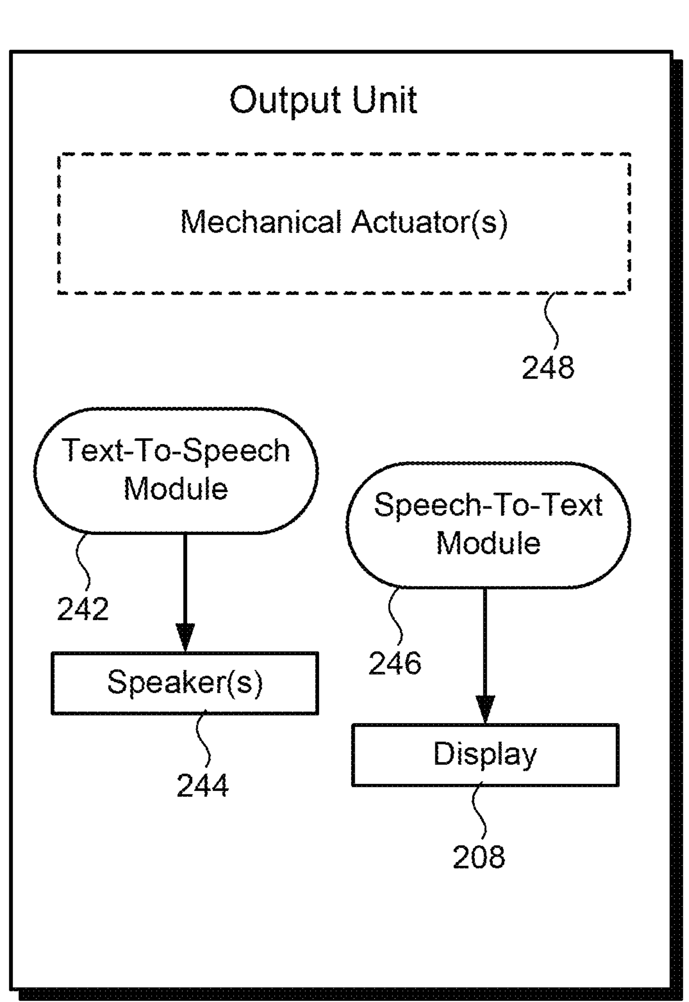
FIG. 2B shows a more detailed diagram of an output unit suitable for use as a component of the system shown in FIG. 1, according to one implementation.

FIG. 2B shows a more detailed diagram of output unit 240 suitable for use as a component of system 100, in FIG. 1, according to one implementation. As shown in FIG. 2B, output unit 240 may include one or more of Text-To-Speech (TTS) module 242 in combination with one or more audio speakers 244 (hereinafter “speaker(s) 244”), and Speech-To-Text (STT) module 246 in combination with display 208. As further shown in FIG. 2B, in some implementations, output unit 240 may include one or more mechanical actuators 248 (hereinafter “mechanical actuator(s) 248”). It is further noted that, when included as a component or components of output unit 240, mechanical actuator(s) 248 may be used to produce facial expressions by AIIC 116*b*, and/or to articulate one or more limbs or joints of AIIC 116*b*. Output unit 240 and display 208 correspond respectively in general to output unit 140 and display 108, in FIG. 1. Thus, output unit 140 and display 108 may share any of the characteristics attributed to output unit 240 and display 208 by the present disclosure, and vice versa.

It is noted that the specific features shown to be included in output unit 140/240 are merely exemplary, and in other implementations, output unit 140/240 may include more, or fewer, features than TTS module 242, speaker(s) 244, STT module 246, display 208, mechanical actuator(s) 248, and haptic actuator(s) 248*b*. Moreover, in other implementations, output unit 140/240 may include a feature or features other than one or more of TTS module 242, speaker(s) 244, STT module 246, display 208, mechanical actuator(s) 248, and haptic actuator(s) 248*b*. As noted above, display 108/208 of output unit 140/240 may be implemented as an LCD, LED display, OLED display, a QD display, or any other suitable display screen that perform a physical transformation of signals to light.

Figure 3:
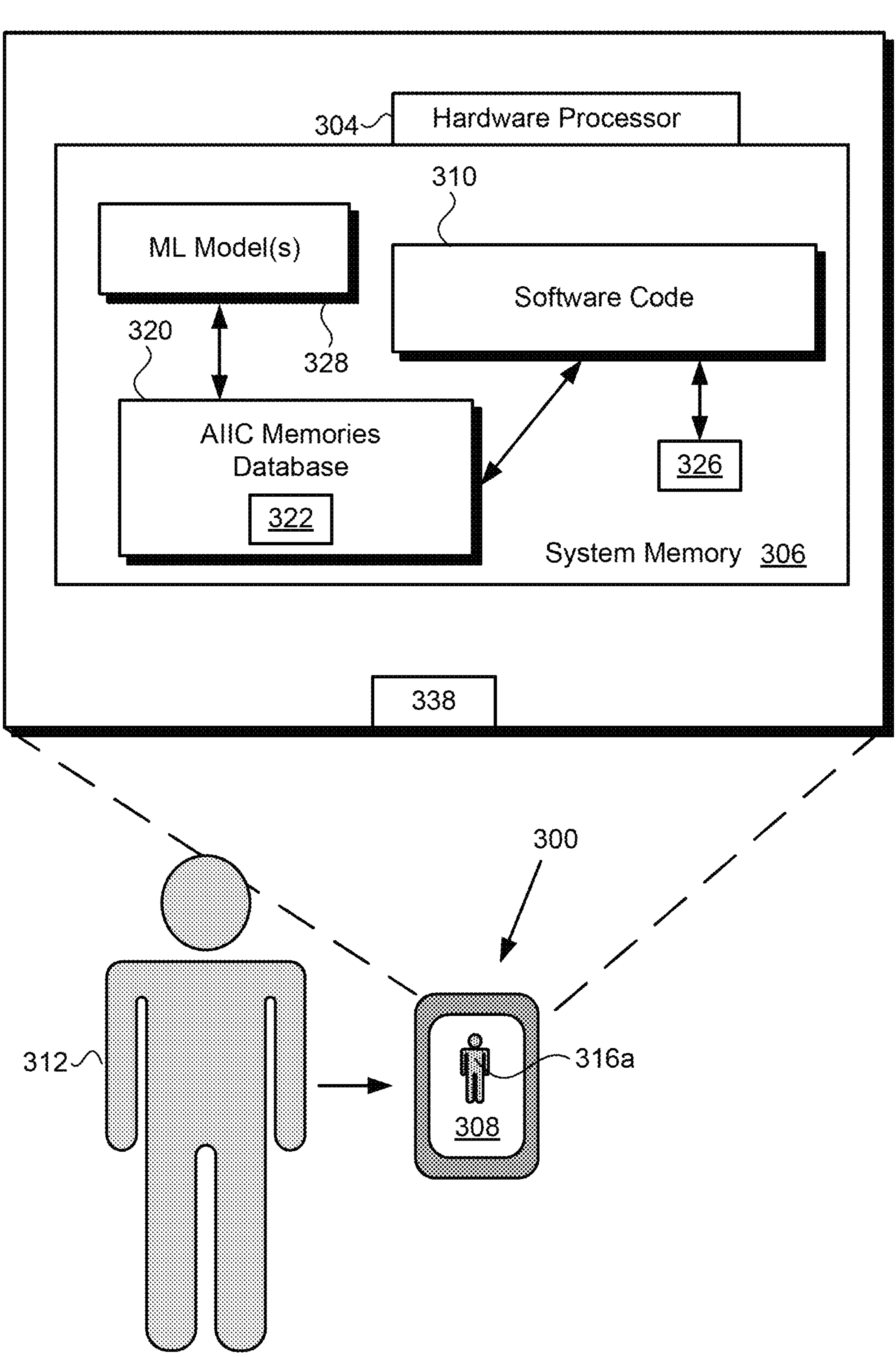
FIG. 3 shows an exemplary system for providing an emotionally responsive AIIC, according to another implementation.

FIG. 3 shows an exemplary system providing an emotionally responsive AIIC, according to another implementation. As shown in FIG. 3, system 300 is shown as a mobile device of user 312. As further shown in FIG. 3, system 300 includes hardware processor 304, system memory 306 implemented as a non-transitory storage medium, display 308, and transceiver 338. According to the exemplary implementation shown in FIG. 3, system memory 306 of system 300 stores software code 310, AIIC memories database 320 including memory data structure 322, user history 326 of user 312, and one or more trained ML models 328, (hereinafter "ML model(s) 328"). Also shown in FIG. 3 is AIIC 316*a* in the form of a digital character rendered on display 308 of system 300.

Although depicted as a smartphone or tablet computer in FIG. 3, in various implementations, system 300 may take the form of any suitable mobile computing system that implements data processing capabilities sufficient to provide a user interface, and implement the functionality ascribed to system 300 herein. For example, in other implementations, system 300 may take the form of a tablet computer, a smart wearable device such as a smartwatch providing display 308, or an augmented reality (AR) or virtual reality (VR) device.

System 300, user 312, and AIIC 316*a* correspond respectively in general to system 100, user 112, and AIIC 116*a*, in FIG. 1. Consequently, system 300, user 312, and AIIC 316*a* may share any of the characteristics attributed to respective system 100, user 112, and AIIC 116*a* by the present disclosure, and vice versa. Thus, although not shown in FIG. 3, like system 100, system 300 may include features corresponding respectively to input unit 130/230, input device 132, and output unit 140/240. Moreover hardware processor 304, system memory 306, display 308, and transceiver 338, in FIG. 3, correspond respectively in general to hardware processor 104, system memory 106, display 108, and transceiver 138, in FIG. 1. Thus, hardware processor 304, system memory 306, display 308, and transceiver 338 may share any of the characteristics attributed to respective hardware processor 104, system memory 106, display 108, and transceiver 138 by the present disclosure, and vice versa.

In addition, software code 310, AIIC memories database 320 including memory data structure 322, and ML model(s) 328, in FIG. 3, correspond respectively in general to software code 110 AIIC memories database 120 including memory data structure 122, and ML model(s) 128 in FIG. 1, while user history 326 corresponds in general to user history 126. That is to say, software code 310, AIIC memories database 320 including memory data structure 322, and ML model(s) 328 may share any of the characteristics attributed to respective software code 110, AIIC memories database 120 including memory data structure 122, and ML model(s) 128 by the present disclosure, and vice versa, while user history 326 may share any of the characteristics attributed to user history 126. In other words, system 300 may include substantially all of the features and functionality attributed to system 100 by the present disclosure.

According to the exemplary implementation shown in FIG. 3, software code 310, AIIC memories database 320, and ML model(s) 328 are located in system memory 306 of system 300, subsequent to transfer of software code 310, AIIC memories database 320, and ML model(s) 328 to system 300 over a packet-switched network, such as the Internet, for example. Once present on system 300, software code 310, AIIC memories database 320, and ML model(s) 328 may be persistently stored in system memory 306, and software code 310 may be executed locally on system 300 by hardware processor 304.

One advantage of local retention and execution of software code 310 on system 300 in the form of a mobile device of user 312 is that any personally identifiable information (PII) or other sensitive personal information of user 312 stored on system 300 may be sequestered on the mobile device in the possession of user 312 and be unavailable to system 100 or other external agents.

FIG. 4 shows a diagram of software code 410 suitable for use by the system 100/300 shown in FIGS. 1 and 3, according to one implementation. As shown in FIG. 4, software code 410 is configured to receive interaction data 414, and to output interactive communication 417, using memory feature extraction block 452, emotional context scoring block 454, and AIIC interaction determination block 456, in combination with ML model(s) 128/328 and memory data structure 122/322 in FIGS. 1 and 3, as well as large-language ML model 129 in FIG. 1. Also shown in FIG. 4 are one or more user memory features 462 (hereinafter "user memory feature(s) 460") predicted using ML model(s) 128/328, one or more AIIC memory features 462 for AIIC 116*a* or 116*b* in FIG. 1 (hereinafter "AIIC memory feature(s) 462") and obtained from memory data structure 122/322 based on user memory feature(s) 460, and one or more candidate interactive communications 466 (hereinafter "candidate interactive communication(s) 466") received from large-language ML model 129 in response to prompt 464 issued by software code 410.

Interaction data 414 and interactive communication 417 correspond respectively in general to interaction data 114 and interactive communication 117, in FIG. 1. Consequently, interaction data 414 and interactive communication 417 may share any of the characteristics attributed to respective interaction data 114 and interactive communication 117 by the present application, and vice versa. In addition, software code 410 corresponds in general to software code 110/310. Thus, software code 110/310 may share any of the characteristics attributed to software code 410 by the present disclosure, and vice versa. That is to say, although not shown in FIGS. 1 and 3, software code 110/310 may include features corresponding respectively to memory feature extraction block 452, emotional context scoring block 454, and AIIC interaction determination block 456.

Figure 5A:
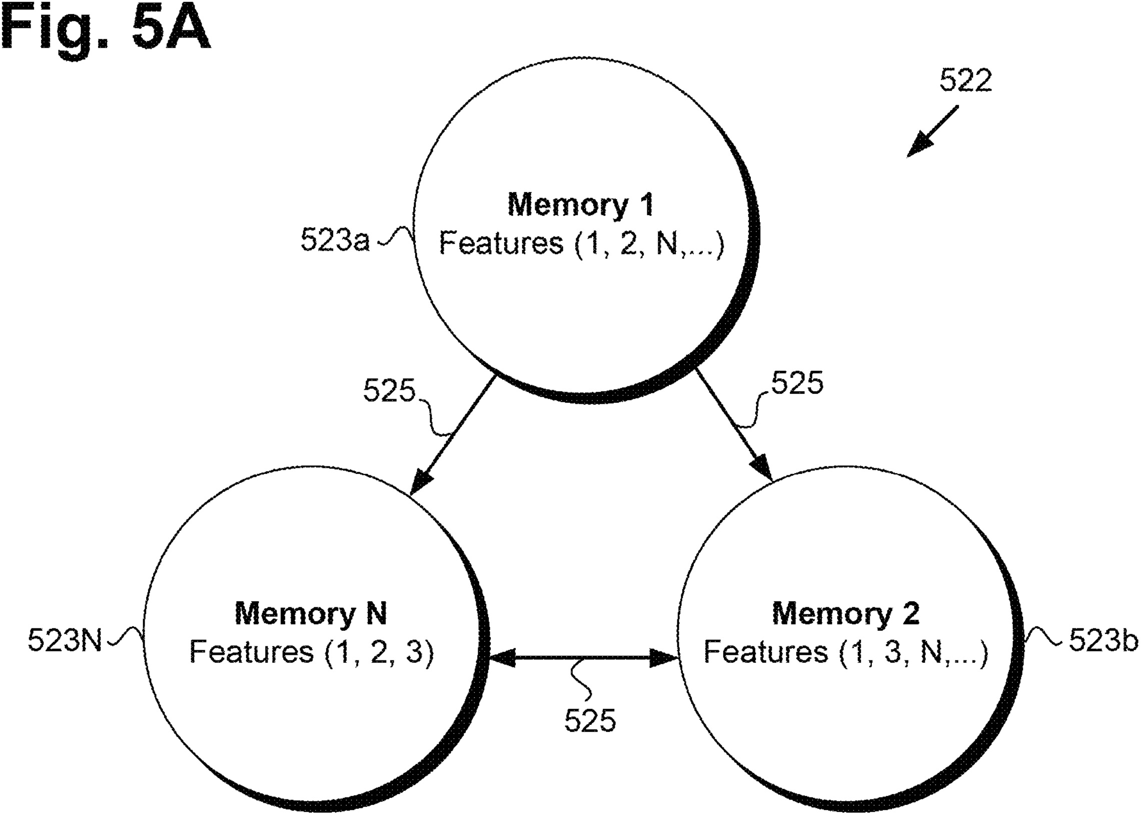
FIG. 5A shows a diagram of an exemplary memory data structure storing memory features for an AIIC, according to one implementation.

FIG. 5A shows a diagram of exemplary memory data structure 522 storing memories including memory features for AIIC 116*a* or 116*b* in FIG. 1, according to one implementation. It is noted that memory data structure 522 corresponds in general to memory structure 122/322, in FIGS. 1 and 3. Consequently, memory data structure 522 may share any of the characteristics attributed to memory data structure 122/322 by the present disclosure, and vice versa.

According to the exemplary implementation shown in FIG. 5A, memory data structure 522 takes the form of a memory constellation including memory nodes 523*a*, 523*b*, and 523N, and edges 525, and serving in part as a memory bank for an AIIC. However, memory data structure 522 need not be static, but may be configured to enable evolution of the memories for the AIIC to amplify the similarities between those memories and the memories of a user in order to strengthen the perceived relationship closeness between the user and the AIIC. It is further noted that although memory data structure 522 depicts three memory nodes and three edges, that representation is provided merely in the interests of conceptual clarity. More generally, memory data structure 522 may include hundreds, thousands, or millions of memory nodes and edges.

In various implementations, memory data structure 522 may take the form of an undirected cyclic graph or an acyclic graph, for example. Each memory node 523*a*, 523*b*, and 523N of memory structure 522 captures descriptive features of a particular memory (hereinafter "memory features"), while each edge 525 captures the relationship between different memories. By way of example, the memory features contained by a memory node may include the people, animals, or objects involved in the memory, as well as the location, the activity, and the emotional state of the memory.

Figure 5B:
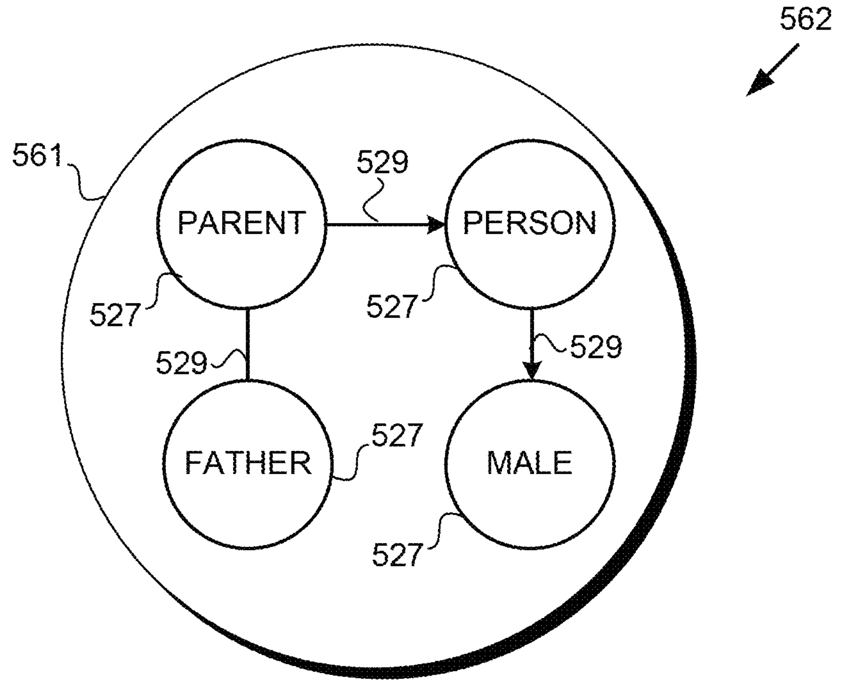
FIG. 5B shows an exemplary memory feature corresponding to one of the memory features stored in the exemplary memory data structure of FIG. 5A, according to one implementation.

FIG. 5B shows exemplary AIIC memory feature 562 corresponding to one of the memory features stored in exemplary memory data structure 522 of FIG. 5A, according to one implementation. As shown in FIG. 5B, AIIC memory feature 562 is represented by knowledge graph 561 that captures additional details such as emotional state or interpretations of AIIC memory feature 562. It is noted that AIIC memory feature 562 may be a synthesized memory feature for an AIIC, or a human generated memory feature for the AIIC. That is to say, memory data structure 122/322/522 may store memory features that have been synthesized for the AIIC, are human generated for the AIIC, or may store synthesized as well as human generated memory features for the AIIC. It is further noted that although AIIC memory feature 562 is depicted as a single memory feature in FIG. 5B, in so far as one or more or AIIC memory feature 562 is included in each of memory nodes 523*a*, 523*b*, and 523N of memory data structure 522, memory data structure 522 may include many hundreds, thousands, or millions of instances or AIIC memory feature 562.

Knowledge graph 561 in FIG. 5B represents AIIC memory feature 562 as multiple nodes 527 connected by semantic links 529 that represent the semantic relationship between the concepts in nodes 527. Although not shown in FIG. 5B, semantic links 529 may include emotional connections as well, such as "enjoys," "loves," "dislikes," and the like. In the example of FIG. 5B, AIIC memory feature 562 representing "father" can be represented by knowledge graph 561 linking the memory feature father with the concepts "parent," "person," and "male."

Figure 6:
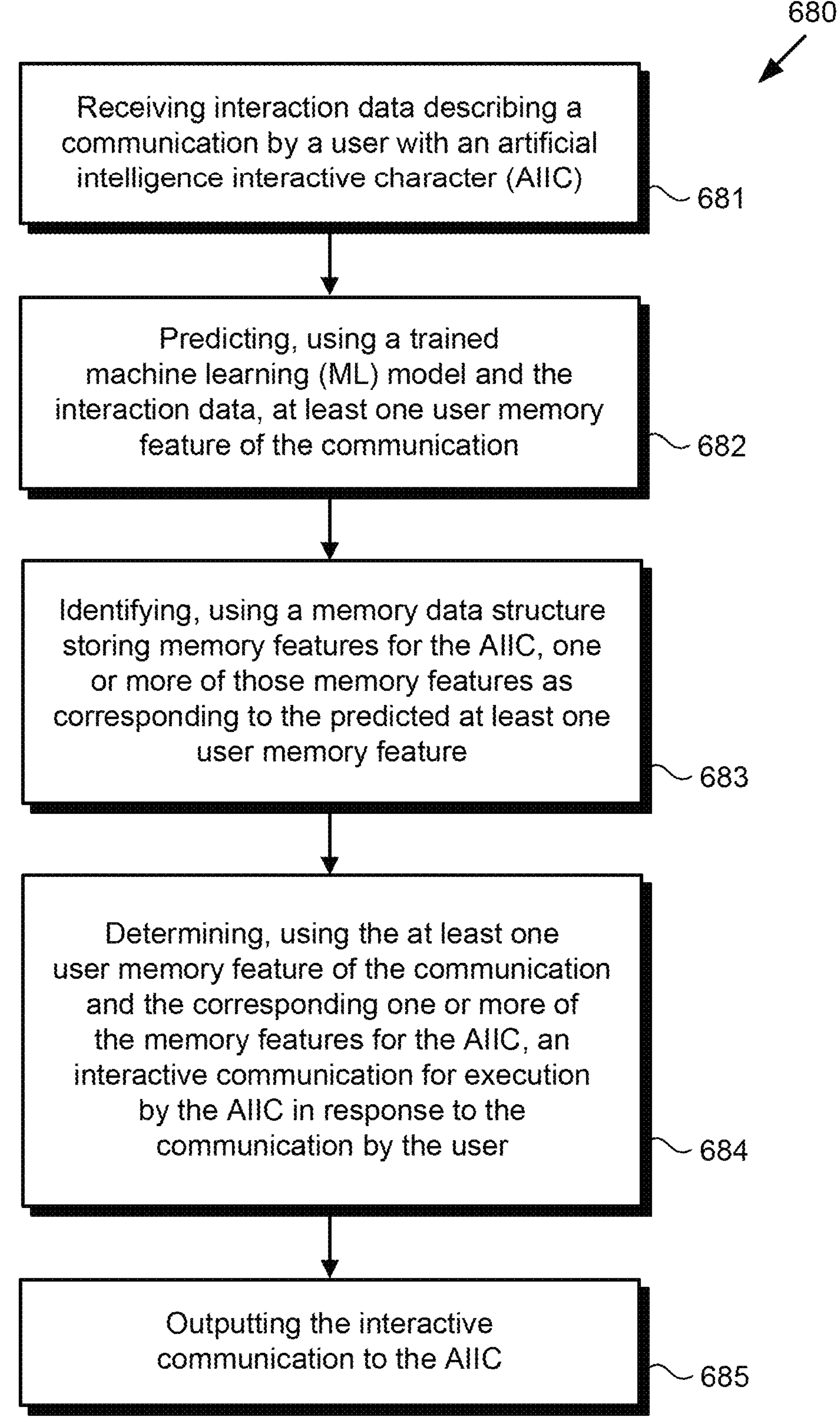
FIG. 6 shows a flowchart presenting an exemplary method for use by a system to provide an emotionally responsive AIIC, according to one implementation.

The functionality of software code 110/310/410 will be further described by reference to FIG. 6. FIG. 6 shows flowchart 680 presenting an exemplary method for use by a system to provide an emotionally responsive AIIC, according to one implementation. With respect to the method outlined in FIG. 6, it is noted that certain details and features have been left out of flowchart 680 in order not to obscure the discussion of the inventive features in the present application.

Referring to FIG. 6, with further reference to FIGS. 1, 2A, 3, and 4, flowchart 680 includes receiving interaction data 114/414 describing a communication by user 112/312 with an AIIC, such as one of AIICs 116*a*/316*a* or 116*b* (action 681). In various implementations, the communication by user 112/312 with the AIIC may include one or more inputs to input device 132/232 by user 112/312, speech, a non-verbal vocalization or a gesture by user 112/312, or a facial expression or posture by user 112/312.

In implementations in which the communication by user 112/312 includes speech, interaction data 114/414 may include the prosody of the speech. It is noted that, as used herein, prosody has its conventional meaning as referring to the stress, rhythm, and intonation of spoken language. Alternatively, or in addition, in implementations in which the communication by user 112/312 includes one or more of inputs to input device 112/312, a gesture, a facial expression, or a posture, interaction data 114/414 may describe one or more of the speed or forcefulness with which those communications are executed by user 112/312. Interaction data 114/414 may be generated by input unit 130/230 of system 100/300, and may be received in action 681 by software code 110/310/410, executed by hardware processor 104/304 of system 100/300.

Flowchart 680 further includes predicting, using trained ML model(s) 128/328 and interaction data 114/414, at least one user memory feature 460 of the communication (hereinafter "user memory feature(s) 460") (action 682). Action 682 may be performed by user memory feature extraction block 452 of software code 110/310/410, executed by hardware processor 104/304 of system 100/300, and using ML model(s) 128/328 trained to perform one or more of natural language processing (NLP) or inferencing based on non-verbal vocalizations, gestures, facial expressions, or postures, for example.

In some implementations, system 100/311 may be configured to predict user memory feature(s) 460 using data in the form of interaction data 114/414 alone. However, in other implementations, hardware processor 104/304 may be configured to execute software code 110/310/410 to utilize information stored in user history 126/326 of user 112/312 to predict user memory feature(s) 460 of the communication by user 112/312.

Flowchart 680 further includes identifying, using memory data structure 122/322/522, one or more of memory features 462/562 for the AIIC as corresponding to user memory feature(s) 460 (action 683). As noted above, memory data structure 122/322/522 may store memory features that have been synthesized for the AIIC, are human generated for the AIIC, or may store synthesized as well as human generated memory features for the AIIC. Thus, the memory feature or features identified in action 673 may include one or more synthesized memory features for the AIIC, one or more human generated memory feature for the AIIC, or a combination of synthetic and human generated memory features for the AIIC. Action 683 may be performed by software code 110/310/410, executed by hardware processor 104/304 of system 100/300, and using emotional context scoring block 454.

Figure 7:
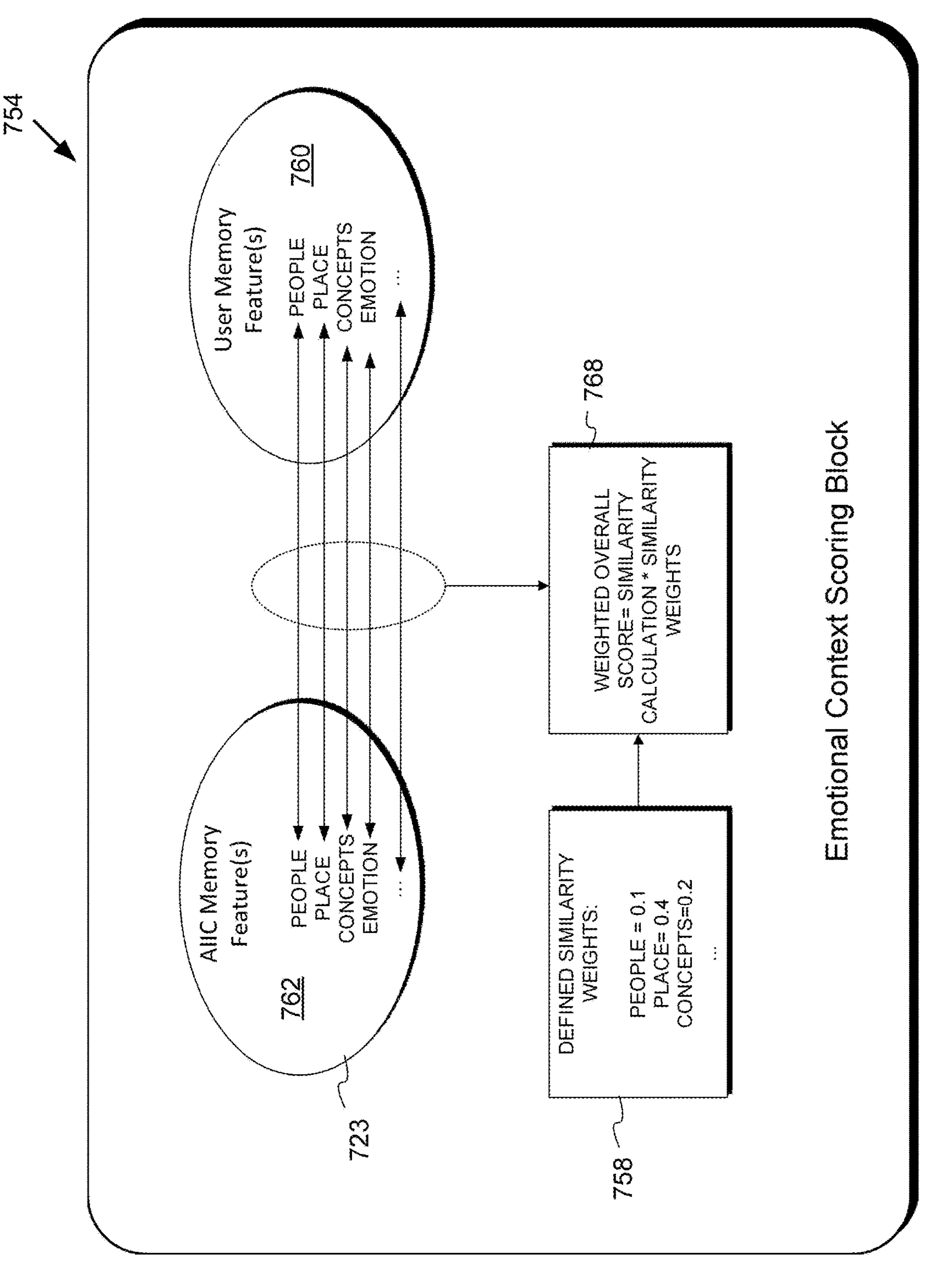
FIG. 7 shows a more detailed diagram of an exemplary emotional context scoring block suitable for inclusion in the software code shown in FIG. 4, according to one implementation.

FIG. 7 shows a more detailed diagram of an exemplary emotional context scoring block suitable for inclusion in software code 110/310/410, according to one implementation. As shown in FIG. 7, exemplary emotional context scoring block 754 includes weighting structure 758 and scorer 768, and utilizes weighting structure 758 and scorer 768 to compare user memory feature(s) 760 with memory 723 including AIIC memory feature(s) 762 for an AIIC. Emotional context scoring block 754 and user memory feature(s) 760, in FIG. 7, correspond respectively in general to emotional context scoring block 454 and user memory feature(s) 460, in FIG. 4. Thus, emotional context scoring block 754 and user memory feature(s) 760 may share any of the characteristics attributed to respective emotional context scoring block 454 and user memory features 462 by the present disclosure, and vice versa. In addition, memory 723 and AIIC memory feature(s) 762 correspond respectively in general to memory 523 in FIG. 5A and AIIC memory feature 562 in FIG. 5B. Thus, memory 723 and AIIC memory feature(s) 762 any of the characteristics attributed to respective memory 523 and memory feature 562 by the present disclosure, and vice versa.

Referring to FIGS. 1, 4, 5A, 5B, and 7 in combination, user memory feature(s) 460/760 may be provided as inputs to emotional context scoring block 454/754 by user feature extraction block 452 of software code 110/310/410. Emotional context scoring block 454/754 may access memory data structure 122/322/522 which holds similarly represented memory features of an AIIC. Although the memory features stored in memory data structure 122/322/522 may be similar in format to predicted user memory feature(s) 460/760, memory data structure 122/322/522 will typically have a very large number of AIIC memory features 762.

AIIC memory feature(s) 762 are authored to create a backstory of the AIIC as a collection of memories of events, people, and places that the AIIC can reference in interacting with user 112/312. While any given user 112/312 may have a constrained set of memories based on actual experiences, memory data structure 122/322/522 may hold a far greater number and variety. In some implementations memory data structure 122/322/522 may include memories that are inconsistent with each other, but which may help the AIIC perform well for various individual users 112/312. For example, one set of AIIC memory features may relate to the recent passing of a loved one, while another set of AIIC memory features may relate to a recent vacation taken with that same loved one.

Emotional context scoring block 454/754 operates to compare predicted user memory feature(s) 460/760 with AIIC memory feature(s) 762. When user 112/312 communicates with the AIIC, user memory feature(s) 460/760 predicted based on interaction data 114/414 describing the communication by the user and create a snapshot of the subject matter of the communication. Those user memory feature(s) 460/760 are compared to AIIC memory feature(s) and a similarity score is derived. This similarity score is proportional to the expected bond induced by the sharing of memory 523/723, and is referred to as a bond factor. Typically, to establish the strongest bond, memory 523/723 with the highest bond factor is selected as the active AIIC memory.

According to the exemplary implementation depicted in FIG. 7, AIIC memory feature(s) 762 and user memory feature(s) 760 include multiple dimensions such as people, place, concepts, and emotion. Other dimensions can be defined to meet the needs of a particular application. Emotional context scoring block 454/754 may operate on a dimension by dimension level to determine similarity at each dimension. The scoring can be performed contemporaneously, i.e., in parallel, over multiple memory feature dimensions. That is to say, a similarity score across each of the dimensions of people, place, and concepts, and emotions, as well as other dimensions, can be computed in parallel. Weighting structure 758 is defined for each dimension. Then similarity scores for each dimension are weighted to produce an overall aggregated score in scorer 768. Depending on the specific use case, the weighting and aggregating can be performed on all, some, or none of the feature dimensions.

In some implementation, scoring may be performed hierarchically with the knowledge graph representation of AIIC memory feature(s) 762, as well as a knowledge graph representation of user memory feature(s) 460/760. That is to say, in some implementations in which user memory feature(s) 460/760 include multiple user memory features, hardware processor 104/304 of system 100/300 may execute software code 110/310/410 to represent those predicted user memory features as a knowledge graph having substantially the same data structure as memory data structure 122/322/522. In those implementations, identifying AIIC memory feature(s) 762 as corresponding to the user memory features further uses that user memory features knowledge graph. Moreover, in some implementations, as noted above, AIIC memory feature(s) 762 identified as corresponding to the predicted user memory feature(s) may by the closest match to the user predicted user memory feature(s) based on the bond factor.

It is noted that an exact memory match may not be required. For example, if a penalty imposed by scorer 768 for a transition from person to friend and person to cousin is low, then a discussion about going to the beach with one's cousin could score high with a memory about going to the beach with one's friend. Whereas going to the beach with one's dog could have a low bond factor because the path between cousin and dog has a high penalty. The penalty values applied by scorer 768 may be initially assigned by experts, or may be derived using machine learning techniques. In either case, the penalty values may be updated over time to improve the performance of emotional context scoring block 454/754 with knowledge gained by conversational experience.

It is further noted that if there are no existing AIIC memory features in memory data structure 122/322/522 that achieves the desired bond factor, memory data structure 122/322/522 may be updated with a hallucinated memory by inserting a new memory node with the user memory features predicted from interaction data 114/414 describing the communication by the user with the AIIC.

Flowchart 680 further includes determining, using the user memory feature(s) 460/760 of the communication and the corresponding AIIC memory feature(s) 762 for the AIIC, interactive communication 117/417 for execution by the AIIC in response to the communication by user 112/312 (action 684). Action 684 may be performed by software code 110/310/410, executed by hardware processor 104/304 of system 100/300, and using AIIC interaction determination block 456.

AIIC memory feature(s) 762 (including emotional state) identified as corresponding to user memory feature(s) 460/760 are provided as inputs to AIIC interaction determination block 456 by emotional context scoring block 454 and serve as the basis for the determination of interactive communication 117/417 for the AIIC. In some implementations AIIC memory feature(s) 762 may be used to produce prompt 464 for large-language ML model 129 to generate a conversational description of AIIC memory feature(s) 762. Large-language ML model 129 may include algorithms that can recognize, summarize, translate, predict, and generate human language on the basis of very large text-based datasets. In some use cases, large-language ML model 129 may be implemented as a cloud-accessible service or other remote resource accessible by software code 110/310/410, as shown by FIG. 1. However, in other use cases large-language ML model 129 be implemented locally, as one of ML model(s) 128/328.

In implementations in which hardware processor 104/304 executes software code 110/310/410 to produce prompt 464 for large-language ML model 129, and to receive candidate interactive communication(s) 466 from large-language ML model 129, action 684 may further including evaluating candidate interactive communication(s) 466 to identify a best interactive communication for use as interactive communication 117/417. Such a determination may be made using AIIC interaction determination block 456. In some such use cases, for example, the determination of a best interactive communication for use as interactive communication 117/417 may be made based on user history 126/326 of user 112/312 to filter amongst candidate interactive communication(s) 466.

Flowchart 680 further includes outputting interactive communication 117/417 to AIIC 116*a* or AIIC 116*b* (action

685). Action 685 may be performed by software code 110/310/410, executed by hardware processor 104/304 of system 100/300. In some implementations AIIC 116*a*, for example, may take the form of a digital character, and interactive communication 117/417 output to AIIC 116*a* may include one or more of speech, a gesture, a facial expression, or a posture for execution by the digital character. In other implementations AIIC 116*b*, for example, may take the form of a machine, and interactive communication 117/417 output to AIIC 116*b* may include one or more of speech, a gesture, a facial expression, or a posture for execution by the machine.

In some implementations, the method outlined by flowchart 680 may conclude with action 685 described above. However, in other implementations, hardware processor 104/304 may further execute software code 110/310/410 to control AIIC 116*a* or AIIC 116*b* to execute interactive communication 117/417. For example, hardware processor 104/304 may execute software code 110/310/410 to utilize output unit 140/240 including display 208, speaker(s) 244, and mechanical actuator(s) 248 to produce speech, text corresponding to speech, a gesture, a facial expression, or a posture for one of AIIC 116*a* or AIIC 116*b*.

With respect to the method outlined by Flowchart 680, it is noted that actions 681, 682, 683, 684, and 685 may be performed as an automated method from which human participation other than the interaction by user 112 with AIIC 116*a* or 116*b* in FIG. 1 may be omitted.

Thus, the present application discloses systems and methods for providing an emotionally responsive AIIC that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not Lit) limited to the particular implementations described herein, but many rearrangements, modifications, and substitutions are possible without departing from the scope of the present disclosure.

What is claimed is:

1. A system comprising:

a computing platform having a hardware processor and a system memory;

the system memory storing a software code, a memory data structure storing a plurality of memory features for an artificial intelligence interactive character (AIIC), and a trained machine learning (ML) model;

the hardware processor configured to execute the software code to:

receive interaction data describing a communication by a user with the AIIC;

predict, using the trained ML model and the interaction data, at least one user memory feature of the communication;

identify, using the memory data structure, one or more of the plurality of memory features for the AIIC as corresponding to the at least one user memory feature, wherein identifying comprises comparing the at least one user memory feature and the one or more of the plurality of memory features across multiple dimensions, and computing an aggregated similarity score using dimension weights;

determine, using the at least one user memory feature of the communication and the corresponding one or more of the plurality of memory features for the AIIC, an interactive communication for execution by the AIIC in response to the communication by the user; and output the interactive communication to the AIIC.

2. The system of claim 1, wherein the plurality of memory features stored by the memory data structure comprise at least one of human generated memory features or synthesized memory features for the AIIC.

3. The system of claim 1, wherein determining the interactive communication for execution by the AIIC in response to the communication by the user comprises evaluating at least one candidate interactive communication output by a large-language ML model accessible by the software code.

4. The system of claim 1, wherein the hardware processor is further configured to execute the software code to:

control the AIIC to execute the interactive communication.

5. The system of claim 1, wherein the AIIC comprises a virtual character, and wherein the interactive communication output to the AIIC comprises at least one of speech, a gesture, a facial expression, or a posture for execution by the virtual character.

6. The system of claim 1, wherein the AIIC comprises a machine, and wherein the interactive communication output to the AIIC comprises at least one of speech, movement, a facial expression, or a posture for execution by the machine.

7. The system of claim 1, wherein the memory data structure comprises one of an undirected cyclic graph or an acyclic graph.

8. The system of claim 1, wherein the predicted at least one user memory feature comprises a plurality of predicted user memory features, and wherein the hardware processor is further configured to execute the software code to:

represent the plurality of predicted user memory features as a knowledge graph having a same data structure as the memory data structure; and wherein identifying the one or more of the plurality of memory features for the AIIC as corresponding to the at least one user memory feature further uses the knowledge graph.

9. The system of claim 1, wherein the communication by the user with the AIIC comprises at least one of speech, text, a non-verbal vocalization, or a gesture by the user, or a facial expression or a posture by the user.

10. The system of claim 1, wherein the communication by the user with the AIIC comprises speech by the user, and wherein the interaction data describes a prosody of the speech.

11. A method for use by a system including a computing platform having a hardware processor and a system memory, the system memory storing a software code, a memory data structure storing a plurality of memory features for an artificial intelligence interactive character (AIIC), and a trained machine learning (ML) model, the method comprising:

receiving, by the software code executed by the hardware processor, interaction data describing a communication by a user with the AIIC;

predicting, by the software code executed by the hardware processor and using the trained ML model and the interaction data, at least one user memory feature of the communication;

identifying, by the software code executed by the hardware processor and using the memory data structure, one or more of the plurality of memory features for the AIIC as corresponding to the at least one user memory feature, wherein identifying comprises comparing the at least one user memory feature and the one or more of the plurality of memory features across multiple dimensions, and computing an aggregated similarity score using dimension weights;

determining, by the software code executed by the hardware processor, using the at least one user memory feature of the communication and the corresponding one or more of the plurality of memory features for the AIIC, an interactive communication for execution by the AIIC in response to the communication by the user; and outputting, by the software code executed by the hardware processor, the interactive communication to the AIIC.

12. The method of claim 11, wherein the plurality of memory features stored by the memory data structure comprise at least one of human generated memory features or synthesized memory features for the AIIC.

13. The method of claim 11, wherein determining the interactive communication for execution by the AIIC in response to the communication by the user comprises evaluating at least one candidate interactive communication output by a large-language ML model accessible by the software code.

14. The method of claim 11, further comprising:

controlling the AIIC, by the software code executed by the hardware processor, to execute the interactive communication.

15. The method of claim 11, wherein the AIIC comprises a virtual character, wherein the interactive communication output to the AIIC comprises at least one of speech, a gesture, a facial expression, or a posture for execution by the virtual character, and wherein the method further comprises controlling the virtual character, by the software code executed by the hardware processor, to execute the interactive communication.

16. The method of claim 11, wherein the AIIC comprises a machine, wherein the interactive communication output to the AIIC comprises at least one of speech, movement, a facial expression, or a posture for execution by the machine, and wherein the method further comprises controlling the machine, by the software code executed by the hardware processor, to execute the interactive communication.

17. The method of claim 11, wherein the predicted at least one user memory feature comprises a plurality of predicted user memory features, the method further comprising:

representing, by the software code executed by the hardware processor, the plurality of predicted user memory features as a knowledge graph having a same data structure as the memory data structure; and wherein identifying the one or more of the plurality of memory features for the AIIC as corresponding to the at least one user memory feature further uses the knowledge graph.

18. The method of claim 11, wherein the communication by the user with the AIIC comprises at least one of speech, text, a non-verbal vocalization, or a gesture by the user, or a facial expression or a posture by the user.

19. The method of claim 11, wherein the communication by the user with the AIIC comprises speech by the user, and wherein the interaction data describes a prosody of the speech.

20. The method of claim 16, wherein the machine comprises a robot.

* * * * *